United States Patent
Mao

[19]

[11] Patent Number: 6,115,276
[45] Date of Patent: Sep. 5, 2000

[54] AC BUS SYSTEM WITH BATTERY CHARGER/INVERTER BACKUP

[75] Inventor: Hengchun Mao, Plano, Tex.

[73] Assignee: Lucent Technologies Inc., Murray Hill, N.J.

[21] Appl. No.: 09/198,918

[22] Filed: Nov. 24, 1998

[51] Int. Cl.[7] .................................................. H02M 7/797
[52] U.S. Cl. ............................. 363/127; 363/17; 363/37
[58] Field of Search ................................. 363/15, 17, 34, 363/35, 37, 125, 126, 127

[56] References Cited

U.S. PATENT DOCUMENTS

| | | | |
|---|---|---|---|
| 4,399,499 | 8/1983 | Butcher et al. | 363/17 |
| 4,719,550 | 1/1988 | Powell et al. | 363/37 |
| 4,870,555 | 9/1989 | White | 363/127 |
| 5,029,062 | 7/1991 | Capel | 363/97 |
| 5,140,509 | 8/1992 | Murugan | 363/17 |
| 5,465,011 | 11/1995 | Miller et al. | 363/34 |
| 5,610,451 | 3/1997 | Symonds | 363/34 |
| 5,610,805 | 3/1997 | Gupta | 363/37 |
| 5,815,384 | 9/1998 | Hammond et al. | 363/127 |
| 5,856,712 | 1/1999 | Suzuki et al. | 363/34 |
| 5,978,236 | 11/1999 | Faberman et al. | 363/37 |
| 5,999,420 | 12/1999 | Aonuma et al. | 363/127 |

OTHER PUBLICATIONS

D. Jugan, J.–P. Leblanc and D. Marquet, "Powering Architectures For New Needs In Telecommunications, " Dec. 1995 IEEE, pp. 196–202.

Didier Marquet and Jacques Girard, "New Power Supply Structure For Telecom Equipments Toward A Unique Level Of Conversion," Nov. 1991 IEEE, pp. 227–232.

*Primary Examiner*—Jeffrey Sterrett

[57] ABSTRACT

A backup power supply for use with a power plant having a primary power supply that provides primary power to an AC bus for subsequent conversion to DC power and a method of providing backup power to the AC bus. In one embodiment, the system includes a battery charger/inverter, coupled to the AC bus and couplable to a battery, that operates in a normal mode to convert a portion of the primary power to charge the battery and operates in a battery backup mode to convert DC power from the battery to provide the backup power to the AC bus.

23 Claims, 4 Drawing Sheets

AC BUS SYSTEM WITH BATTERY CHARGER/INVERTER BACKUP

TECHNICAL FIELD OF THE INVENTION

The present invention is directed, in general, to a power plant and, more specifically, to a system and method for providing backup power to the power plant.

BACKGROUND OF THE INVENTION

The traditional reliability of telecommunication systems that users have come to expect and rely upon is based in part on the systems' operation on redundant equipment and power supplies. Telecommunication switching systems, for example, route tens of thousands of calls per second. The failure of such systems, due to the loss of incoming AC power, is unacceptable since it would result in a loss of millions of telephone calls and a corresponding loss of revenue.

Power plants, such as battery plants, address the power loss problem by providing the system with a backup power supply for use in the event the incoming AC power is interrupted. Since telecommunications systems often require the backup power supply to provide power to the load for durations ranging from a few seconds to a few days, the implementation of a battery backup system has a significant impact on both the performance and the cost of the power plant.

Traditionally, companies locate telecommunications systems in a central office environment wherein large-capacity power plants provide an energy reserve adequate to power the systems for up to a few days. A power plant based on a DC-bus architecture usually contains a rectifier that processes the incoming AC power and produces therefrom DC power that is applied to a DC battery bus. The power plant further contains a number of batteries, coupled to the DC battery bus, that provide the energy reserve in the event the incoming AC power is interrupted. The power plant provides power to a number of isolated DC—DC converters, typically board mounted power supplies coupled to the loads, that scale the DC power of the DC battery bus to DC power of specific, well-regulated voltages as required by the particular loads.

The rectifier includes a power factor correction circuit that processes the incoming AC power and produces therefrom high voltage DC power. The rectifier further includes an inverter that generates high frequency AC power from the high voltage DC power, for transmission across an isolation transformer. The rectifier still further includes a rectifier circuit and a filter circuit that convert the high frequency AC power into DC power suitable for coupling to the DC battery bus. During a normal mode, the DC power provided to the DC battery bus by the rectifier is used to power the loads and to charge the batteries.

Each isolated DC—DC converter includes an input filter circuit and an inverting circuit that produce high frequency AC power from the DC power on the DC battery bus for transmission across an isolation transformer. The isolated DC—DC converter further includes a diode rectifier circuit and a filter circuit that rectifies the high frequency AC power to produce DC power of a specific, well-regulated DC voltage for output to the load.

Power plants employing the above described DC-bus architecture have the advantages of relatively high system reliability and good decoupling between the various units of load equipment. Because the rectifiers and isolated DC—DC converters are coupled to the DC battery bus, however, this architecture requires many components and power conversion stages and is thus inefficient, bulky and expensive. Additionally, power plants based on the DC-bus architecture expose the power components contained therein to relatively high voltage and current stresses caused by voltage and current variations in the DC battery bus. While the DC-bus architecture remains suitable for spacious central office environments, remote switching equipment, such as those located within the tight confines of wireless base stations, would benefit from a more efficient power architecture requiring fewer components.

Another power architecture currently employed in the telecommunications industry attempts to overcome some of the disadvantages discussed above by eliminating the DC battery bus. In this case, the rectifier circuit and filter circuit of the above described rectifier may be eliminated. The rectifier thus includes a power factor correction circuit that processes the incoming AC power to produce high voltage DC power. The rectifier further includes an inverter that takes the high voltage DC power and generates therefrom high frequency AC power for transmission across an isolation transformer. Since the DC battery bus is no longer available, the batteries are directly coupled, via a DC—DC battery charger/inverter, to the high voltage DC power output of the power factor correction circuit.

Further, the isolated DC—DC converters employed by the DC-bus architecture can be replaced by post-regulator circuits, coupled to an AC bus formed by the isolation transformer. The post-regulator circuits convert AC power on the AC bus to DC power for output to the loads. Typically, each post-regulator circuit includes a diode rectifier circuit, a switching circuit and a filter circuit. By replacing the isolated DC—DC converters with the post-regulator circuits, the input filter circuit and the inverting circuit required by the DC-bus architecture can be eliminated.

While power plants based on this architecture contain fewer components and are, therefore, less costly than those based on the DC-bus architecture, a major disadvantage is the cost and size of the DC—DC battery charger/inverter. Additionally, the power plant is relatively inefficient in a battery backup mode wherein DC power from the battery, available at a low battery voltage (typically 24 or 48 VDC), is stepped up to match the high voltage DC power generated by the power factor correction circuitry (typically 400 VDC).

Accordingly, what is needed in the art is a system for providing backup power that overcomes the disadvantages of the power architectures described above and is thus suitable for use with emerging remote telecommunications systems such as small wireless base stations.

SUMMARY OF THE INVENTION

To address the above-discussed deficiencies of the prior art, the present invention provides, for use with a power plant having a primary power supply that provides primary power to an AC bus for subsequent conversion to DC power, a backup power supply for, and method of, providing backup power to the AC bus. In one embodiment, the backup power supply includes a battery charger/inverter, coupled to the AC bus and couplable to a battery, that operates in a normal mode to convert a portion of the primary power to charge the battery and operates in a battery backup mode to convert DC power from the battery to provide the backup power to the AC bus.

The present invention therefore introduces a system and method that, in one embodiment, seamlessly provides primary power and backup power to an AC bus, allowing a load coupled thereto to receive power independent of an availability of the incoming AC power.

In one embodiment of the present invention, the power plant includes a DC post-regulator circuit that converts the DC power from the battery to provide regulated DC power to a load. The DC post-regulator circuit may be coupled to and share circuitry with the battery charger/inverter to further increase the efficiency of the power plant.

In another embodiment, the power plant includes an AC post-regulator circuit, coupled to the AC bus, that converts AC power on the AC bus to provide regulated DC power to a load. Those skilled in the art are familiar with conventional AC post-regulator circuits.

In one embodiment of the present invention, the primary power supply includes a power factor correction circuit coupled to an inverter via a DC link, the inverter providing the primary power. In a related embodiment, the primary power supply further includes a separation circuit, coupled to the power factor correction circuit, that separates the power factor correction circuit from the inverter when the battery charger/inverter operates in the battery backup mode. Those skilled in the art are familiar with conventional power factor correction circuits and inverters.

In another embodiment of the present invention, the system further includes at least one battery, coupled to the battery charger/inverter, that operates at a voltage selected from the group consisting of: (1) 24 volts and (2) 48 volts. Of course, the present invention may employ batteries operating at other voltages.

In one embodiment of the present invention, the AC bus carries AC power at a frequency exceeding 60 Hertz. Those skilled in the pertinent art will understand, however, that the present invention can accommodate AC power at frequencies other than 60 Hertz.

In another embodiment of the present invention, the battery charger/inverter is embodied in a single module. The battery charger/inverter is, therefore, capable of bidirectional operation. Of course, the battery charger/inverter may be embodied in two or more separate modules, each operating in a single direction. One module may operate as a battery charger to convert a portion of the primary power to charge the battery while another cooperating module may operate as an inverter to convert DC power from the battery to provide the backup power to the AC bus.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
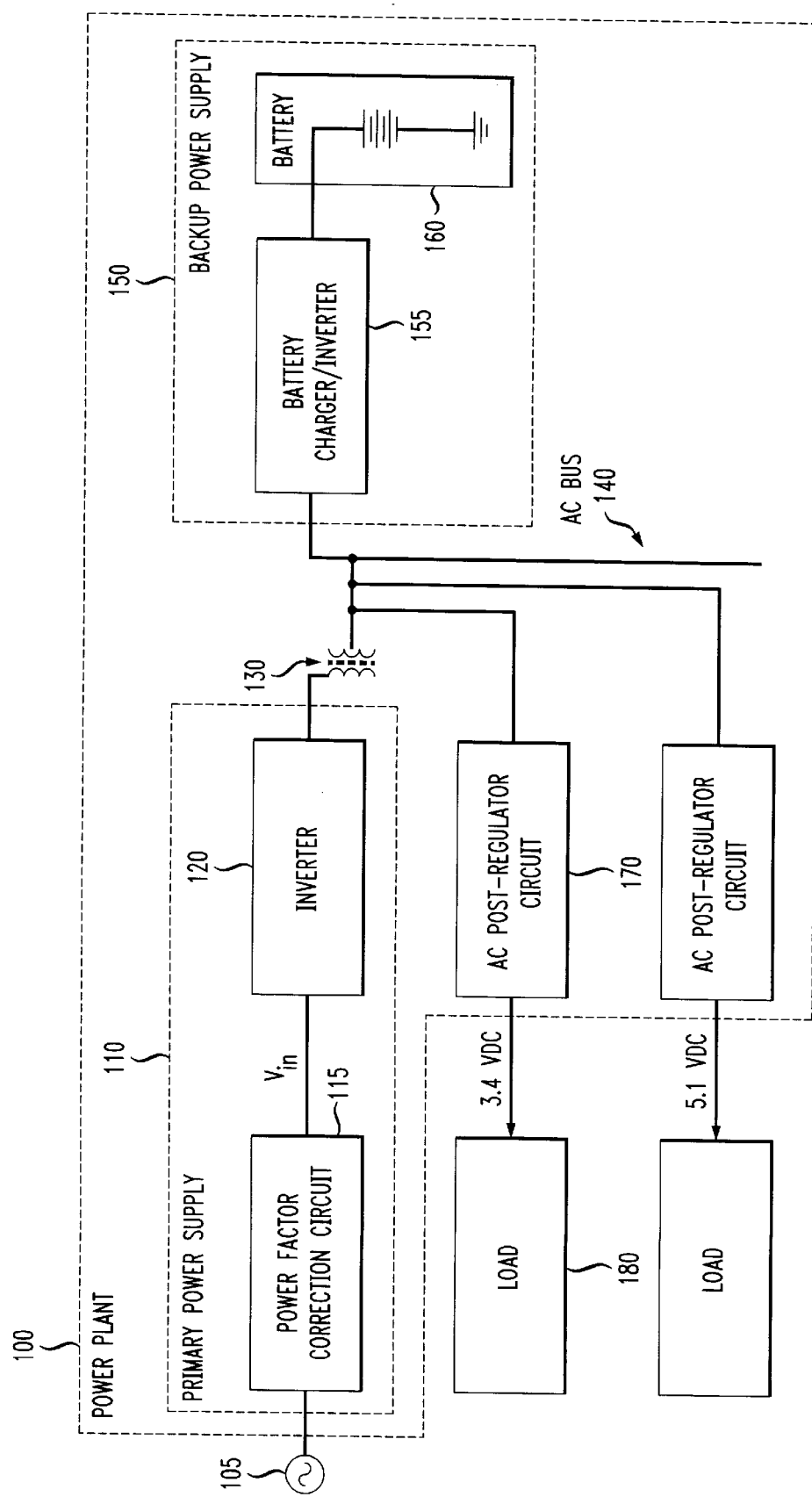
FIG. 1 illustrates a block diagram of an embodiment of a power plant constructed in accordance with the principles of the present invention.

Referring initially to FIG. 1, illustrated is a block diagram of an embodiment of a power plant 100 constructed in accordance with the principles of the present invention. The power plant 100 includes a primary power supply 110 that provides primary power to an AC bus 140. The power plant 100 further includes a backup power supply 150 that provides backup power to the AC bus 140.

The power plant 100 further includes a number of AC post-regulator circuits (one of which is designated 170), coupled to the AC bus 140, that cooperate to convert AC power on the AC bus to provide regulated DC power to the loads (one of which is designated 180).

The primary power supply 110 includes a power factor correction circuit 115 coupled to an input of the power plant 100. The primary power supply 110 further includes an inverter 120 coupled to the power factor correction circuit 115 via a DC link and to an isolation transformer 130 having a primary winding and a number of secondary windings. In the illustrated embodiment, the secondary windings of the isolation transformer 130 form the AC bus 140. Alternatively, the AC bus 140 may be coupled to the isolation transformer 130 through an additional transformer. The backup power supply 150 includes a battery charger/inverter 155 coupled between the AC bus 140 and a battery 160.

The illustrated embodiment of the power plant 100 operates as follows. In a normal mode, incoming AC power (e.g., commercial 60 Hz AC power) is available from a primary power source 105. The power factor correction circuit 115 receives the incoming AC power and generates therefrom DC power having a DC link voltage Vin. The inverter 120 then takes the DC power and generates therefrom high frequency AC power for transmission across the isolation transformer 130.

The inverter 120 thus provides primary power to the AC bus 140. If necessary, the battery charger/inverter 155 converts a portion of the primary power into DC power to charge the battery 160. The AC post-regulator circuits 170 convert a portion of the AC power on the AC bus 140 into regulated DC power suitable for powering the loads 180. In one embodiment of the present invention, a frequency of the high frequency AC power exceeds 60 Hertz. In the illustrated embodiment, a frequency of the high frequency AC power is about 100 kilohertz. Of course, the AC bus 140 may carry AC power of any frequency.

During a battery backup mode, the incoming AC power is interrupted and the inverter 120 cannot provide primary power to the AC bus 140. The battery charger/inverter 155 therefore takes the DC power from the battery 160 and generates therefrom high frequency AC power for transmission across the isolation transformer 130. The battery charger/inverter 155 thus provides backup power to the AC bus 140. While the battery charger/inverter 155 illustrated and described provides high frequency AC power to the AC bus 140, those skilled in the art realize that the battery charger/inverter 155 can convert the DC power into AC power of any frequency. If battery backup is not required, both the battery 160 and the battery charger/inverter 155 may be removed from the power plant 100. In an advantageous embodiment, the battery charger/inverter 155 is regulated to provide a stable DC link voltage Vin in the primary power supply 110. In such an embodiment, the inverter 120 provides the AC bus 140 with stable high frequency AC power, whether or not incoming AC power is available (independent of availability).

The AC post-regulator circuits 170 then convert the high frequency AC power on the AC bus 140 into well-regulated DC power to power the loads 180. In a preferred embodiment, the AC post-regulator circuits 170 contain rectifiers, inductive-capacitive filters and switching devices such as magnetic amplifiers (magamps) or semiconductor switches. AC post-regulator circuits 170 are familiar to those skilled in the art and, therefore, will not be discussed in detail. Of course, the use of any conventional AC post-regulator circuits 170 is well within the broad scope of the present invention. Further, while the illustrated embodiment depicts the AC post-regulator circuits 170 as having output voltages of 3.4 VDC and 5.1 VDC, those skilled in the art understand that the AC post-regulator circuits 170 may produce DC power of any voltage, as required by the individual loads 180. In an advantageous embodiment of the present invention, the AC bus 140 is formed by a number of secondary windings, a turns ratio of each secondary winding selected to scale the high frequency AC power to a desired output voltage. Of course, AC post-regulator circuits 170 that power loads 180 requiring similar voltages may derive power from the same secondary winding.

Figure 2:
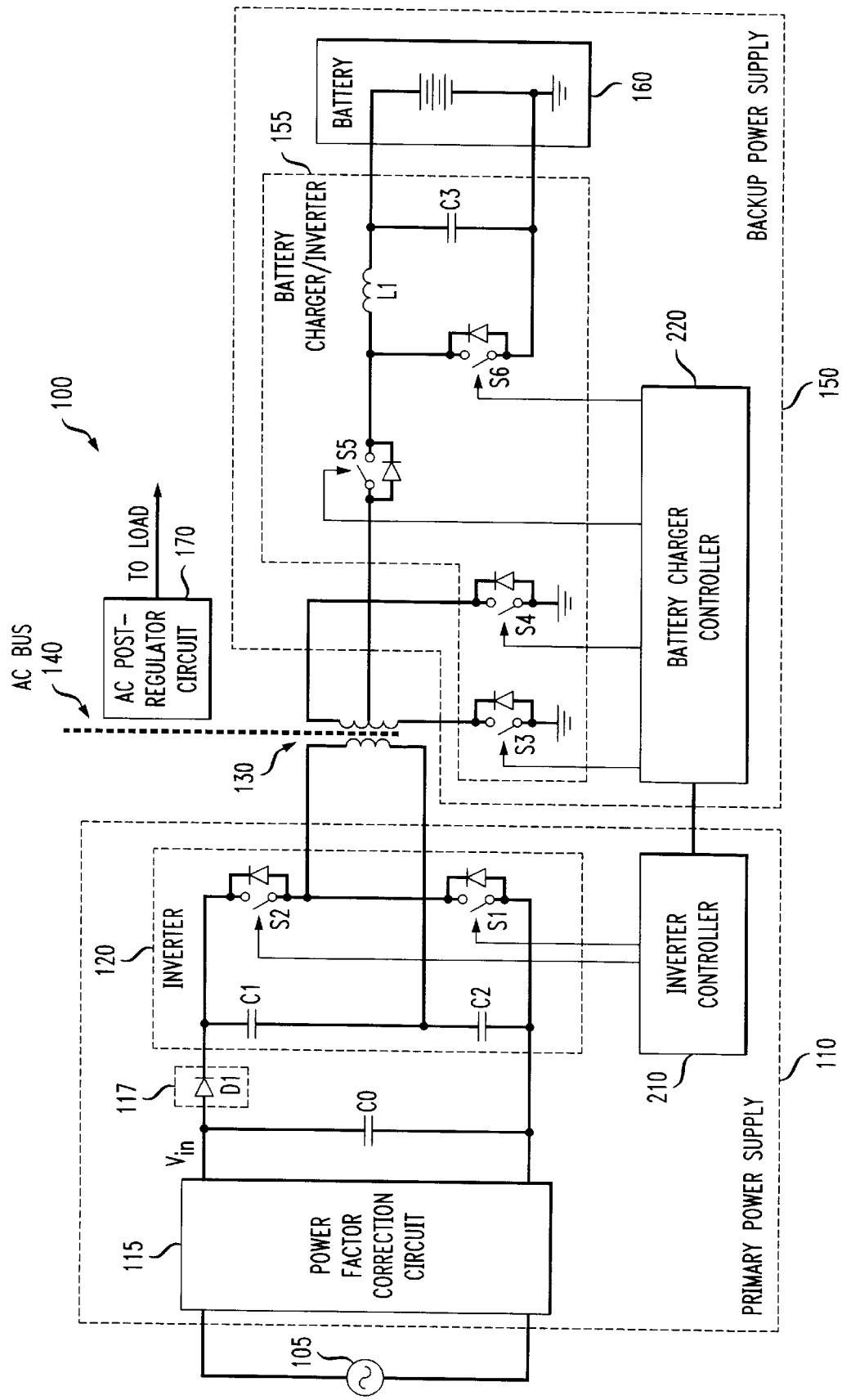
FIG. 2 illustrates a schematic diagram of an exemplary implementation of the power plant of FIG. 1.

Turning now to FIG. 2, and with continuing reference to FIG. 1, illustrated is a schematic diagram of an exemplary implementation of the power plant 100. The inverter 120 is illustrated as a half-bridge inverter, formed by first and second primary switches S1, S2 and first and second capacitors C1, C2. Of course, the use of other inverter topologies is well within the broad scope of the present invention. The battery charger/inverter 155 includes first and second secondary switches S3, S4 and first and second charging switches S5, S6, coupled to a secondary winding of the isolation transformer 130. In the illustrated embodiment, the secondary switches S3, S4 are coupled to end taps of a secondary winding of the isolation transformer 130 while the first charging switch S5 is coupled to a center tap of the secondary winding. The second charging switch S6 is coupled across an output of the battery charger/inverter 155. The battery charger/inverter 155 further includes a filter, consisting of a filter inductor L1 and a filter capacitor C3. For simplicity, other portions of the primary power supply 110, the backup power supply 150 and other windings of the isolation transformer 130 are not illustrated in detail.

In the illustrated embodiment, the primary switches S1, S2 are controlled by an inverter controller 210. The inverter controller 210 may operate the primary switches S1, S2 at a fixed, substantially 50% duty cycle. Alternatively, the inverter controller 210 may generate pulse width modulated control signals to operate the primary switches S1, S2. Those skilled in the art are familiar with convention pulse width modulation techniques. In one embodiment, the inverter controller 210 may operate the primary switches S1, S2 to regulate a voltage of the high frequency AC power supplied to the AC bus 140. In an alternative embodiment, the inverter controller 210 may operate the primary switches S1, S2 to regulate a charging voltage provided to the battery 160. Due to a relatively wide voltage and current range of the battery 160, however, using the primary switches S1, S2 to regulate the voltage of the battery 160 is not preferred. Of course, the inverter controller 210 may also operate the primary switches S1, S2 to regulate the output of the AC post-regulator circuit 170.

During the normal mode, a battery charger controller 220 operates the secondary switches S3, S4 as synchronous rectifiers to convert a portion of the high frequency AC power on the AC bus 140 to DC power to charge the battery 160. While the use of synchronous rectifiers is not required, those skilled in the art are familiar with an improved efficiency resulting therefrom. In a preferred embodiment, the battery charger controller 220 communicates with the inverter controller 210 to synchronize the secondary switches S3, S4 with the primary switches S1, S2. The duty cycle of the secondary switches S3, S4 may be similar to the duty cycle of the primary switches S1, S2. Alternatively, the duty cycles of the secondary switches S3, S4 and the primary switches S1, S2 may be different. The first charging switch S5 will, in either case, determine an effective duty cycle for charging the battery 160. In the illustrated embodiment, the first charging switch S5 controls a charging current and a charging voltage applied to the battery 160, while the second charging switch S6 operates as a synchronous rectifier to maintain a DC voltage across the battery 160. In a preferred embodiment, the battery charger controller 220 communicates with the inverter controller 210 to synchronize the first charging switch S5 with the primary and secondary switches S1, S2, S3, S4, thereby ensuring proper control of the charging current and the charging voltage.

During the battery backup mode, incoming AC power is not available from the primary power source 105. The battery charger/inverter 155, therefore, operates as an inverter to transfer power from the battery 160 to the isolation transformer 130 and, therefore, to the AC bus 140. The charger controller 220 operates the second charging switch S6 to boost the voltage of the battery 160 up to a voltage of the AC bus 140. By controlling a duty cycle of the second charger switch S6, the DC link voltage Vin can be regulated to a value substantially equal to the DC link voltage Vin present during the normal mode, thus enabling the AC post-regulator circuits 170 to operate without regard to the mode of the power plant 100.

In the battery backup mode, the first charging switch S5 operates as a synchronous rectifier. The secondary switches S3, S4 form an inverter for transferring power to the primary winding of the isolation transformer 130. In a preferred embodiment, the battery charger controller 220 communicates with the inverter controller 210 to synchronize the primary, secondary and charging switches S1, S2, S3, S4, S5, S6. The primary switches S1, S2 clamp the voltage across the isolation transformer 130. The primary switches S1, S2 thus conduct less current in the battery backup mode than in the normal mode wherein the primary switches S1, S2 are required to transfer power across the isolation transformer 130. Additionally, since rectification of power from the primary power source 105 is not required, the efficiency of the power plant 100 may be higher in the battery backup mode than in the normal mode. Further, voltage and current stress experienced by components in the AC post-regulator circuits 170 are determined by the DC link voltage Vin and a turns ratio of the isolation transformer 130 and are, therefore, independent of variations in the battery voltage. Elimination of the additional circuitry required by the conventional DC-bus architecture thus allows the power plant 100 of the present invention to possess the advantages of higher efficiency, higher power density and lower power loss.

In the illustrated embodiment, the primary power supply 110 further includes a separation circuit 117 coupled to the power factor correction circuit 115. The separation circuit 117 separates the power factor correction circuit 115 from the inverter 120 when the battery charger/inverter 155 operates in the battery backup mode. The separation circuit 117 is illustrated as a diode D1 coupled between an input capacitor C0 and the inverter 120. Alternatively, the separation circuit 1117 may be coupled between the power factor correction circuit 115 and the input capacitor C0. The orientation of the diode D1 prevents a portion of the power in the inverter 120 from flowing to the input of the power plant 100 in the battery backup mode. Power loss is thus reduced in the event that the power factor correction circuitry 115 fails. While the separation circuit 117 is illustrated as a diode D1, those skilled in the art will realize that other components and circuits may be employed to reduce reverse current flowing in the power plant 100, thereby separating the power factor correction circuit 115 from the inverter 120. Of course, the separation circuit 117 is not necessary to practice the present invention.

In many applications, a load requiring a voltage approximating the battery voltage may utilize a significant portion of the power output of the power plant 100. In such applications, it would be advantageous for the AC post-regulator circuit 170 and the battery charger/inverter 155 to share some circuitry, thus enhancing an overall efficiency of the power plant 100.

Figure 3:
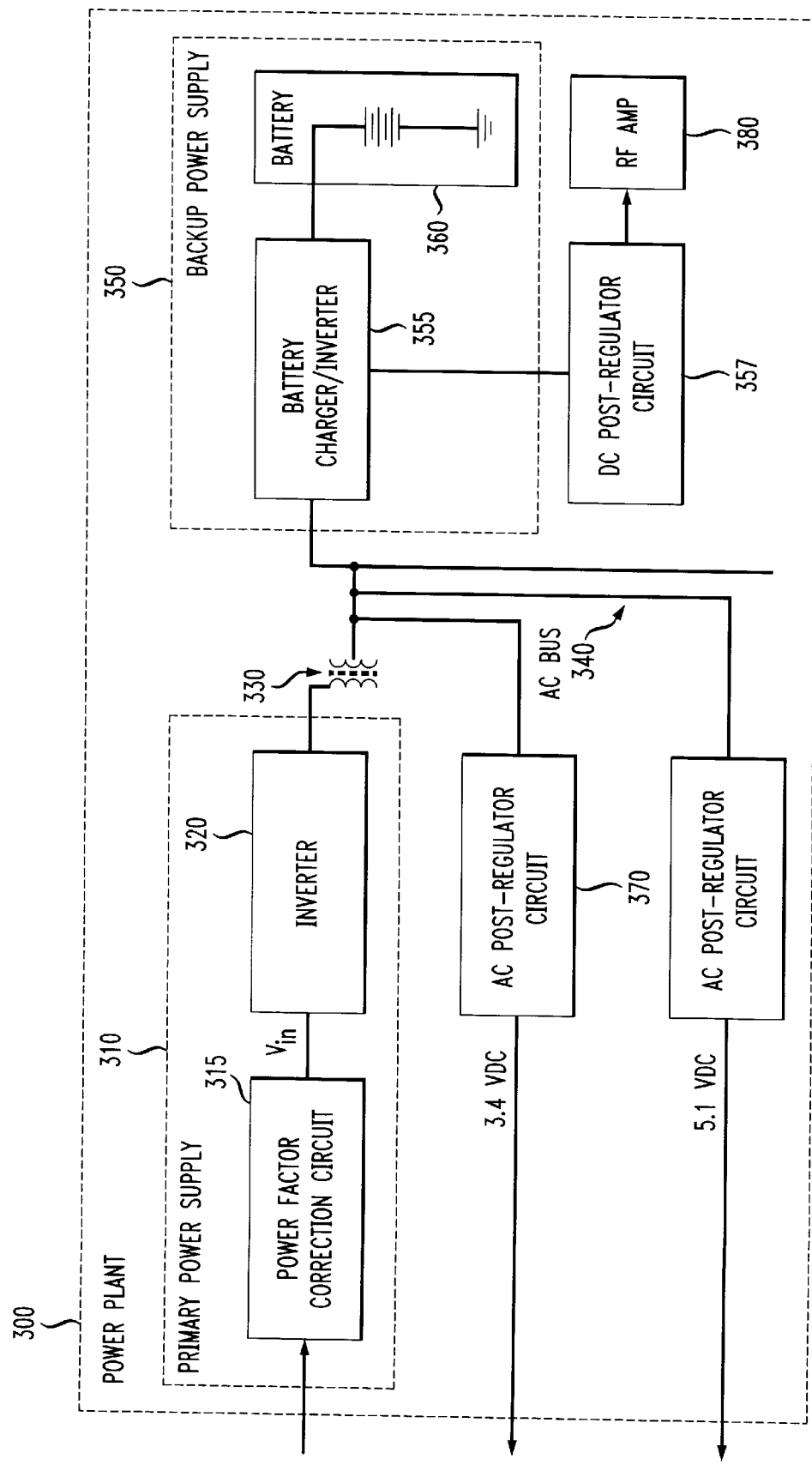
FIG. 3 illustrates a block diagram of another embodiment of a power plant constructed in accordance with the principles of the present invention.

Turning now to FIG. 3, illustrated is a block diagram of another embodiment of a power plant 300 constructed in accordance with the principles of the present invention. The power plant 300 is similar to the power plant 100 of FIG. 1 and will not be described in detail. The power plant 300 includes a primary power supply 310 that provides primary power to an AC bus 340. The power plant 300 further includes a backup power supply 350 that provides backup power to the AC bus 340. The power plant 300 further includes a number of AC post-regulator circuits (one of which is designated 370), coupled to the AC bus 340, that convert AC power on the AC bus to provide regulated DC power to the loads.

The primary power supply 310 includes a power factor correction circuit 315 coupled to an input of the power plant 300. The primary power supply 310 further includes an inverter 320 coupled to the power factor correction circuit 315 via a DC link and to an isolation transformer 330 having a primary winding and a number of secondary windings. In the illustrated embodiment, the secondary windings of the isolation transformer 330 form the AC bus 340. The backup power supply 350 includes a battery charger/inverter 355 coupled between the AC bus 340 and a battery 360.

The illustrated power plant 300 is optimized for use in wireless base stations containing a load, such as a radio frequency amplifier 380, that requires a voltage approximating the battery voltage. To accommodate the radio frequency amplifier 380, the power plant 300 further includes a DC post-regulator circuit 357, directly coupled to the battery charger/inverter 355, that converts DC power from the battery 360 to provide regulated DC power to the radio frequency amplifier 380.

Figure 4:
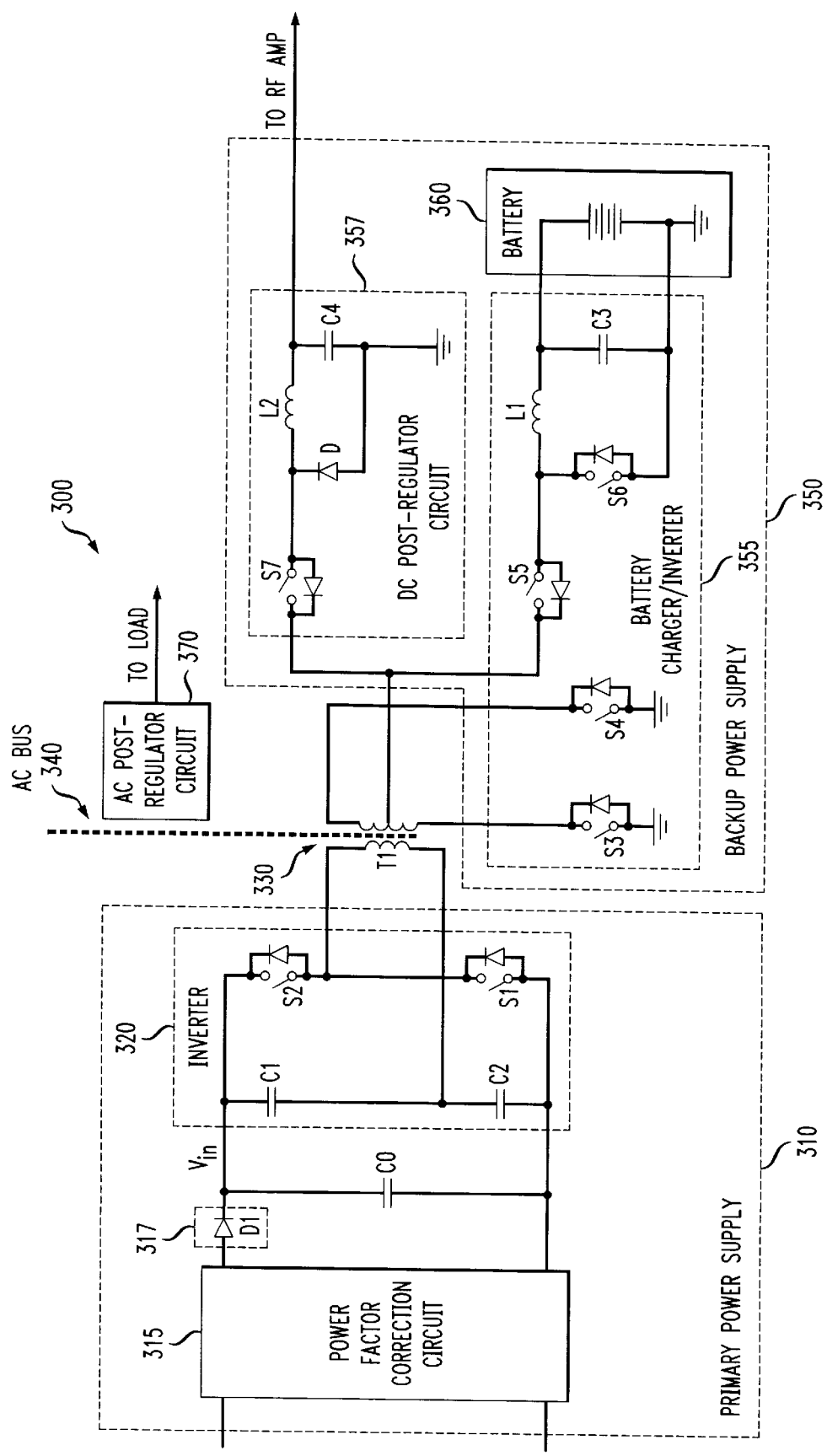
FIG. 4 illustrates a schematic diagram of an exemplary implementation of the power plant of FIG. 3.

Turning now to FIG. 4, and with continuing reference to FIG. 3, illustrated is a schematic diagram of an exemplary implementation of the power plant 300. The inverter 320 is illustrated as a half-bridge inverter, formed by first and second primary switches S1, S2, together with first and second capacitors C1 and C2. The battery charger/inverter 355 includes first and second secondary switches S3, S4 and first and second charging switches S5, S6, coupled to a secondary winding of the isolation transformer 330. The battery charger/inverter 355 further includes a filter consisting of a first filter inductor L1 and a first filter capacitor C3. Since the DC post-regulator circuit 357 provides DC power of a voltage approximating the battery voltage, it may be directly coupled to the battery charger/inverter 355. In the illustrated embodiment, the DC post-regulator circuit 357 includes a post-regulator switch S7, a rectifier diode D and an output filter consisting of a second filter inductor L2 and a second filter capacitor C4. For simplicity, other portions of the primary power supply 310, the backup power supply 350 and other windings of the isolation transformer 330 are not illustrated in detail.

In the illustrated embodiment, the primary power supply 310 further includes a separation circuit 317 coupled to the power factor correction circuit 315. The separation circuit 317 separates the power factor correction circuit 315 from the inverter 320 when the battery charger/inverter 355 operates in the battery backup mode. The separation circuit 317 is illustrated as a diode D1 coupled between the power factor correction circuit 315 and an input capacitor C0. Alternatively, the separation circuit 317 may be a diode D1 coupled between the input capacitor C0 and the inverter 320. The orientation of the diode D1 prevents a portion of the power in the inverter 320 from flowing to the input of the power plant 300 in the battery backup mode. Power loss is thus reduced in the event that the power factor correction circuitry 310 fails. While the separation circuit 317 is illustrated as a diode D1, those skilled in the art will realize that other components and circuits may be employed to reduce reverse current flowing in the power plant 300, thereby separating the power factor correction circuit 315 from the inverter 320. Of course, the separation circuit 317 is not necessary to practice the present invention.

By directly coupling the battery charger/inverter 355 and the DC post-regulator circuit 357 for the radio frequency amplifier 380, the operation of the power plant 300 may be further improved. In the normal mode, the secondary switches S3, S4 operate as synchronous rectifiers for both the battery charger/inverter 355 and the DC post-regulator circuit 357. In the battery backup mode, the secondary switches S3, S4 operate as an inverter to deliver power from the battery 360 to the AC bus 340. Since a large portion of the total power output is delivered directly to the DC post-regulator circuit 357, losses inherent in the inverter 320 and the transformer 330 may be reduced. High efficiency, low cost and high power density may thus be achieved.

In the illustrated embodiment, the battery charger/inverter 355 is embodied in a single module and is capable of bi-directional operation. Of course, the battery charger/inverter 355 may be embodied in two or more separate unidirectional or bidirectional modules. One module may operate as a battery charger to convert a portion of the primary power to charge the battery, while another cooperating module may operate as an inverter to convert DC power from the battery to provide the backup power to the AC bus. If the battery charger/inverter 355 is required to operate only as a battery charger, the second charging switch S6 may be replaced by a diode. Alternatively, if the battery charger/inverter 355 is required to operate only as an inverter, the first charging switch S5 may be replaced by a diode.

Those skilled in the art should understand that the previously described embodiments of the power plants 100, 300 are submitted for illustrative purposes only, and other embodiments capable of providing primary power and backup power to an AC bus, thus allowing a load coupled thereto to receive power independent of the availability of incoming AC power, are well within the broad scope of the present invention. For a better understanding of power electronics including power supplies and conversion technologies, see "Principles of Power Electronics," by J. G. Kassakian, M. F. Schlecht and G. C. Verghese, Addison-Wesley (1991). For a better understanding of power supply architectures, see "Powering Architectures for New Needs in Telecommunications," by D. Jugan, J. P. Leblanc and D. Marquet, Intelec '95 (1995) and "New Power Supply Structure for Telecom Equipments Toward a Unique Level of Conversion," by Didier Marquet and Jacques Girard, Intelec '91 (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power plant having a primary power supply that provides primary power to an AC bus for subsequent conversion to DC power, a backup power supply for providing backup power to said AC bus, comprising:
   a battery charger/inverter having first and second secondary switches and first and second charging switches, coupled to said AC bus and couplable to a battery, operable in:
   a normal mode, wherein said first and second secondary switches are employed as synchronous rectifiers to convert a portion of said primary power to charge said battery, said first charging switch controlling a charging current and a charging voltage applied to said battery; and
   a battery backup mode, wherein said first and second secondary switches are employed as an inverter to convert DC power from said battery to provide said backup power to said AC bus, said second charging switch boosting a voltage of said battery to a voltage of said AC bus.

2. The backup power supply as recited in claim 1 wherein said power plant further comprises a DC post-regulator circuit, coupled to said battery charger/inverter, that converts said DC power from said battery to provide regulated DC power to a load.

3. The backup power supply as recited in claim 1 wherein said power plant further comprises an AC post-regulator circuit, coupled to said AC bus, that converts AC power on said AC bus to provide regulated DC power to a load.

4. The backup power supply as recited in claim 1 wherein said primary power supply includes a power factor correction circuit coupled to an inverter via a DC link, said inverter providing said primary power.

5. The backup power supply as recited in claim 4 wherein said primary power supply further includes a separation circuit, coupled to said power factor correction circuit, that separates said power factor correction circuit from said inverter when said battery charger/inverter operates in said battery backup mode.

6. The backup power supply as recited in claim 1 further comprising at least one battery, coupled to said battery charger/inverter, that operates at a voltage selected from the group consisting of:
   24 volts, and
   48 volts.

7. The backup power supply as recited in claim 1 wherein said AC bus carries AC power at a frequency exceeding 60 Hertz.

8. The backup power supply as recited in claim 1 wherein said battery charger/inverter is embodied in a single module.

9. For use with a power plant having a primary power supply that provides primary power to an AC bus for subsequent conversion to DC power, a method of providing backup power to said AC bus, comprising:
   operating a battery charger/inverter having first and second secondary switches and first and second charging switches, coupled to said AC bus and couplable to a battery, in a normal mode, wherein said first and second secondary switches are employed as synchronous rectifiers to convert a portion of said primary power to charge said battery, said first charging switch controlling a charging current and a charging voltage applied to said battery; and
   operating said battery charger/inverter in a battery backup mode, wherein said first and second secondary switches are employed as an inverter to convert DC power from said battery to provide said backup power to said AC bus, said second charging switch boosting a voltage of said battery to a voltage of said AC bus.

10. The method as recited in claim 9 wherein said power plant includes a DC post-regulator circuit, said method further comprising converting said DC power from said battery to provide regulated DC power to a load.

11. The method as recited in claim 9 wherein said power plant includes an AC post-regulator circuit, said method further comprising converting AC power on said AC bus to provide regulated DC power to a load.

12. The method as recited in claim 9 wherein said primary power supply includes a power factor correction circuit coupled to an inverter via a DC link, said method further comprising providing said primary power from said inverter.

13. The method as recited in claim 12 wherein said primary power supply further includes a separation circuit coupled to said power factor correction circuit, said method further comprising separating said power factor correction circuit from said inverter when said battery charger/inverter operates in said battery backup mode.

14. The method as recited in claim 9 wherein said battery charger/inverter is coupled to at least one battery, said method further comprising operating said at least one battery at a voltage selected from the group consisting of:
   24 volts, and
   48 volts.

15. The method as recited in claim 9 wherein said AC bus carries AC power at a frequency exceeding 60 Hertz.

16. The method as recited in claim 9 wherein said battery charger/inverter is embodied in a single module.

17. A power plant, comprising:
   a primary power supply that provides primary power;
   an AC bus, coupled to an output of said primary power supply, that distributes AC power, including said primary power;
   a backup power supply that provides backup power to said AC bus for distribution thereby and includes a battery charger/inverter having first and second secondary switches and first and second charging switches, coupled to said AC bus and couplable to a battery, operable in:
   a normal mode, wherein said first and second secondary switches are employed as synchronous rectifiers to convert a portion of said primary power to charge said battery, said first charging switch controlling a charging current and a charging voltage applied to said battery, and a battery backup mode, wherein said first and second secondary switches are employed as an inverter to convert DC power from said battery to provide said backup power to said AC bus, said second charging switch boosting a voltage of said battery to a voltage of said AC bus; and at least one AC post-regulator circuit, coupled to said AC bus, that converts said AC power to provide regulated DC power to a load.

18. The power plant as recited in claim 17 further comprising a DC post-regulator circuit that converts said DC power from said battery to provide regulated DC power to a load.

19. The power plant as recited in claim 17 wherein said primary power supply includes a power factor correction circuit coupled to an inverter via a DC link, said inverter providing said primary power.

20. The power plant as recited in claim 19 wherein said primary power supply further includes a separation circuit, coupled to said power factor correction circuit, that separates said power factor correction circuit from said inverter when said battery charger/inverter operates in said battery backup mode.

21. The power plant as recited in claim 17 further comprising at least one battery, coupled to said battery charger/inverter, that operates at a voltage selected from the group consisting of:

24 volts, and 48 volts.

22. The power plant as recited in claim 17 wherein said AC bus carries AC power at a frequency exceeding 60 Hertz.

23. The power plant as recited in claim 17 wherein said battery charger/inverter is embodied in a single module.

* * * * *